US011157410B2

(12) United States Patent
Jaskiewicz et al.

(10) Patent No.: US 11,157,410 B2
(45) Date of Patent: Oct. 26, 2021

(54) SYSTEM AND METHOD FOR BROADCAST CACHE INVALIDATION

(71) Applicant: Open Text SA ULC, Halifax (CA)

(72) Inventors: Michael Gerard Jaskiewicz, Urbandale, IA (US); Sarah Barnes Atlas, Austin, TX (US); Mukesh Chowdhary, Round Rock, TX (US); Lloyd Douglas Forrest, Austin, TX (US)

(73) Assignee: OPEN TEXT SA ULC, Halifax (CA)

( * ) Notice: Subject to any disclaimer, the term of this patent is extended or adjusted under 35 U.S.C. 154(b) by 44 days.

(21) Appl. No.: 16/146,541

(22) Filed: Sep. 28, 2018

(65) Prior Publication Data

US 2019/0102297 A1 Apr. 4, 2019

Related U.S. Application Data

(60) Provisional application No. 62/565,761, filed on Sep. 29, 2017.

(51) Int. Cl.
*G06F 12/084* (2016.01)
*G06F 12/123* (2016.01)
(Continued)

(52) U.S. Cl.
CPC .......... *G06F 12/084* (2013.01); *G06F 12/123* (2013.01); *G06F 16/00* (2019.01);
(Continued)

(58) Field of Classification Search
CPC .... G06F 12/084; G06F 16/9574; G06F 16/00; G06F 12/123; G06F 2212/683; H04L 67/02; H04L 67/2842
See application file for complete search history.

(56) References Cited

U.S. PATENT DOCUMENTS

2012/0324170 A1* 12/2012 McKenney ......... G06F 12/0817 711/135
2013/0268930 A1* 10/2013 Saidi .................. G06F 12/0833 718/1

(Continued)

OTHER PUBLICATIONS

"OpenText™ Web Experience Management: Dynamic Site and Portal Configuration Guide," 2017, portions of, 172 pages, Open Text Corporation, Waterloo, Ontario, Canada.

(Continued)

*Primary Examiner* — David Yi
*Assistant Examiner* — Dustin B. Fulford
(74) *Attorney, Agent, or Firm* — Sprinkle IP Law Group

(57) ABSTRACT

One embodiment includes a system comprising a repository configured to store objects, an object cache configured to cache objects retrieved from the repository by a node, a memory configured to store a broadcast cache invalidation queue accessible by a plurality of nodes and an invalidation status, a processor coupled to the memory and a computer readable medium storing computer-executable instructions. The computer-executable instructions can be executable to store cache invalidations in the invalidation queue, the cache invalidations identifying objects affected by operations, access the invalidation status to determine a last processed invalidation from the invalidation queue, determine a set of unprocessed invalidations from the cache invalidation queue, the unprocessed invalidations subsequent to the last processed invalidation, clear cached objects from the object cache based on the set of unprocessed invalidations and update the invalidation status based on a last invalidation from the set of unprocessed invalidations.

21 Claims, 11 Drawing Sheets

(51) Int. Cl.
*H04L 29/08* (2006.01)
*G06F 16/957* (2019.01)
*G06F 16/00* (2019.01)

(52) U.S. Cl.
CPC .......... *G06F 16/9574* (2019.01); *H04L 67/02* (2013.01); *H04L 67/2842* (2013.01); *G06F 2212/683* (2013.01)

(56) References Cited

U.S. PATENT DOCUMENTS

| | | | | |
|---|---|---|---|---|
| 2014/0344225 | A1* | 11/2014 | Martin .................. | G06F 16/217<br>707/687 |
| 2017/0249310 | A1* | 8/2017 | Kumar .............. | G06F 16/24552 |
| 2019/0004969 | A1* | 1/2019 | Orogvany ............... | G06F 3/067 |

OTHER PUBLICATIONS

"OpenText™ Web Experience Management: Dynamic Site and Portal Configuration Guide," Open Text Corporation, Waterloo, Ontario, Canada, Apr. 11, 2017, 330 pgs.

* cited by examiner

#processorName=<UNIQUE_NAME>

#pollingPeriod=5000

#batchSize=50

#maxQueueThreshold=1000

#sharedCache=false

#fileTracking=false

#stateDirectory=<file path>

#sharedCacheMaxDelay=15000

500

Init – start thread with bean

501 thread run –
    get database start time to set as local start time
    Only run if not hpd and not mgmt

502 check state dir read/writable if filetracking or shared cache
504     check can generate processor name
        handleStartup
506         get last processed seq id from db/file or register node in db/file
            check for max queue threshold - set last seq id appropriately
        if shared cache create -
508         own prop file
            create last processed file with seq id 0 if not present and no shared lock file present

Figure 9A

SYSTEM AND METHOD FOR BROADCAST CACHE INVALIDATION

RELATED APPLICATIONS

This application claims the benefit of priority under 35 U.S.C. § 119(e) of U.S. Provisional Patent Application No. 62/565,761, filed Sep. 29, 2017, entitled "System and Method for Broadcast Cache Invalidation," by Jaskiewicz et al., which is hereby fully incorporated by reference herein for all purposes.

BACKGROUND

With the proliferation of information on the Internet, it is becoming increasingly difficult to prepare and deliver page content to end users in an efficient and timely manner. Current content delivery systems employ various content publishing techniques to distribute the content to a final target audience (e.g., World Wide Web users, corporate intranet users or other audience). Many web pages are produced by in-sequence actions. For example, a set of web pages are generated by an application server and made available to a web server for appropriate actions. In other words, the web pages are produced at an application layer and published to a presentation layer.

In some publication models, the website content (logic and static elements of pages) is developed and managed in a management stage and then published to a production delivery stage configured to provide web pages to the target audience. In response to an end user request, the web server and applications in the production delivery stage may cooperate to generate portions of a web page, assemble web pages on-the-fly and serve the assembled web pages to the end user based on web site assets. To increase the speed at which the production delivery stage responds to subsequent requests, the delivery stage may cache the website content underlying the pages assembled on-the-fly in an object cache and the generated web page content or web page portions in a page cache.

The website content underlying the pages assembled on-the-fly may be modified, requiring invalidation of entries in the object cache and page cache. One cache invalidation technique requires registering each delivery stage server node that has an object cache with the management stage. For example, if a delivery stage cluster has four such server nodes, myhost1, myhost2, myhost3, myhost4, all using port 8031 to listen for messages from the management stage, then the nodes may be registered as follows:

http://myhost1:8031/<contextname>,
http://myhost2:8031/<contextname>,
http://myhost3:8031/<contextname>,
http://myhost4:8031/<contextname>

When an operation at the management stage requires invalidation of the caches at the deployment stages, a deployment agent at the management stage sequentially sends remote calls to each registered server node identifying the content to invalidate in the cache. Based on the remote calls, the remote server nodes acknowledge the calls, invalidate the appropriate entries in their object caches and collect any updated assets from the management stage. The delivery stage nodes may also invalidate their page caches.

Such invalidation techniques can lead to several problems. When a registered node is unavailable, invalidation messages to a subsequent registered node may be delayed, possibly resulting in that node delivering pages with stale page content. The unavailability of a registered node may also result in a backlog of invalidation messages when the management stage stores the invalidation messages to the unavailable node so that the messages may be retried at a later time. In order to account for delays, unacknowledged invalidations, unavailable nodes, etc., the deployment agent must maintain a separate backlog of invalidations for each node containing only those messages that were not sent to/received by the corresponding node. Storing these backlogs and repeatedly retrying the backlogged messages can consume an undesirable amount of processing and network resources, particularly as the size and number of caches grow.

Additional issues can result when a new delivery stage node is added. The new node will not receive cache invalidation messages from the management stage until the new node is registered at the management stage and the deployment agent at the management stage is restarted.

Moreover, the invalidations are communicated to delivery stage nodes using a different mechanism than content changes. If a delivery stage misses or cannot access an invalidation, the delivery stage node may have a mismatch between what is in its object cache and the updated content, but continue to use the stale content from the object cache.

SUMMARY

One embodiment includes a cache invalidation system comprising a repository configured to store objects, an object cache configured to cache objects retrieved from the repository by a node, a memory configured to store a cache invalidation queue accessible by a plurality of nodes and an invalidation status, a processor coupled to the memory and a computer readable medium storing computer-executable instructions executable by the processor. The computer-executable instructions can be executable to receive notifications of operations that affect objects in the repository, store cache invalidations in the invalidation queue, the cache invalidations identifying objects affected by the operations, access the invalidation status to determine a last processed invalidation from the invalidation queue, determine a set of unprocessed invalidations from the cache invalidation queue, the unprocessed invalidations subsequent to the last processed invalidation, clear cached objects from the object cache based on the set of unprocessed invalidations and update the invalidation status based on a last invalidation from the set of unprocessed invalidations.

According to one embodiment, the computer-executable instructions are executable to implement a loop to periodically poll the cache invalidation queue for the set of unprocessed invalidations, clear cached objects from the object cache based on the set of unprocessed invalidations and update the invalidation status based on the last invalidation from the set of unprocessed invalidations.

According to one embodiment, the computer-executable instructions are executable to obtain a set of unprocessed invalidations from the invalidations queue and clear, from the object cache, the cached objects referenced in invalidations from the set of unprocessed invalidations from the object cache.

The memory, according to one embodiment, is further configured to store an invalidation threshold. The computer-executable instructions can be executable to clear the entire object cache based on a determination that a number of invalidations in the set of unprocessed invalidations exceeds the threshold.

According to one embodiment, the computer executable instructions are further executable to run in a selected mode of operation selected from a first mode of operation and a second mode of operation, wherein in the first mode of operation the invalidation status is stored in a database and in the second mode of operation the invalidation status is stored in an invalidation status file.

The object cache may be a shared cache. The computer-executable instructions can be executable to obtain a lock on the shared cache using a shared lock file stored at a shared location and clear the cached objects from the shared cache while the lock is asserted.

The computer computer-executable instructions can be executable to access the invalidation status from a shared invalidation status file or store the invalidation states to the shared invalidation status file According to one embodiment, the object cache caches objects of a web site used to generate page code. In one embodiment, the object cache caches Java objects.

According to one embodiment, the notifications of operations that affect objects in the repository comprise records of operations from a remote node. The cache invalidation queue, according to one embodiment, comprises the records of operations.

One embodiment of a cache invalidation system includes a management node comprising a delivery agent configured to receive notifications of operations that affect published content from a content management system and maintain a cache invalidation queue. The cache invalidation system can also include a delivery node comprising a cache invalidator. The cache invalidator can be configured to periodically poll the management node for cache invalidations from the cache invalidation queue, determine a last cache invalidation from the broadcast cache invalidation queue processed by the cache invalidator for the delivery node, determine a set of unprocessed invalidations in the cache invalidation queue, clear one or more items in an object cache at the delivery node based on the unprocessed invalidations in the invalidation queue; and update an invalidation status for the delivery node to update the last cache invalidation from the invalidation queue processed by the cache invalidator.

The cache invalidator can be configured to maintain the invalidation status for the delivery node in database or in a file, such as a file in a local file system.

According to one embodiment, the cache invalidator is configurable to run in a selected mode of operation selected from a first mode of operation and a second mode of operation, wherein in the first mode of operation the cache invalidator maintains the invalidation status for the delivery node in a database and in the second mode of operation the cache invalidator is configured to maintain the invalidation status for the delivery node in a file in a local file system.

According to one embodiment, the cache invalidator is configured to clear the entire object cache if a number of unprocessed cache invalidations is greater than a predefined threshold.

According to one embodiment, the cache invalidator is configured to clear from the object cache, one or more items referenced in the unprocessed cache invalidations.

According to one embodiment, the object cache is a shared cache and the cache invalidator is configured to obtain a lock on the shared cache and clear the one or more items from the shared cache while the lock is asserted.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 9A and FIG. 9B illustrate an example of pseudocode for one embodiment of a cache invalidator.

DESCRIPTION

Various embodiments of the disclosure are illustrated in the FIGURES, like numerals being generally used to refer to like and corresponding parts of the various drawings. Embodiments of the disclosure provide systems and methods for regenerating cached pages. Descriptions of well-known starting materials, processing techniques, components and equipment are omitted so as not to unnecessarily obscure the invention in detail. It should be understood, however, that the detailed description and the specific examples, while indicating preferred embodiments of the systems and methods, are given by way of illustration only and not by way of limitation. Various substitutions, modifications, additions and/or rearrangements within the spirit and/or scope of the underlying inventive concept will become apparent to those skilled in the art from this disclosure.

Figure 1:
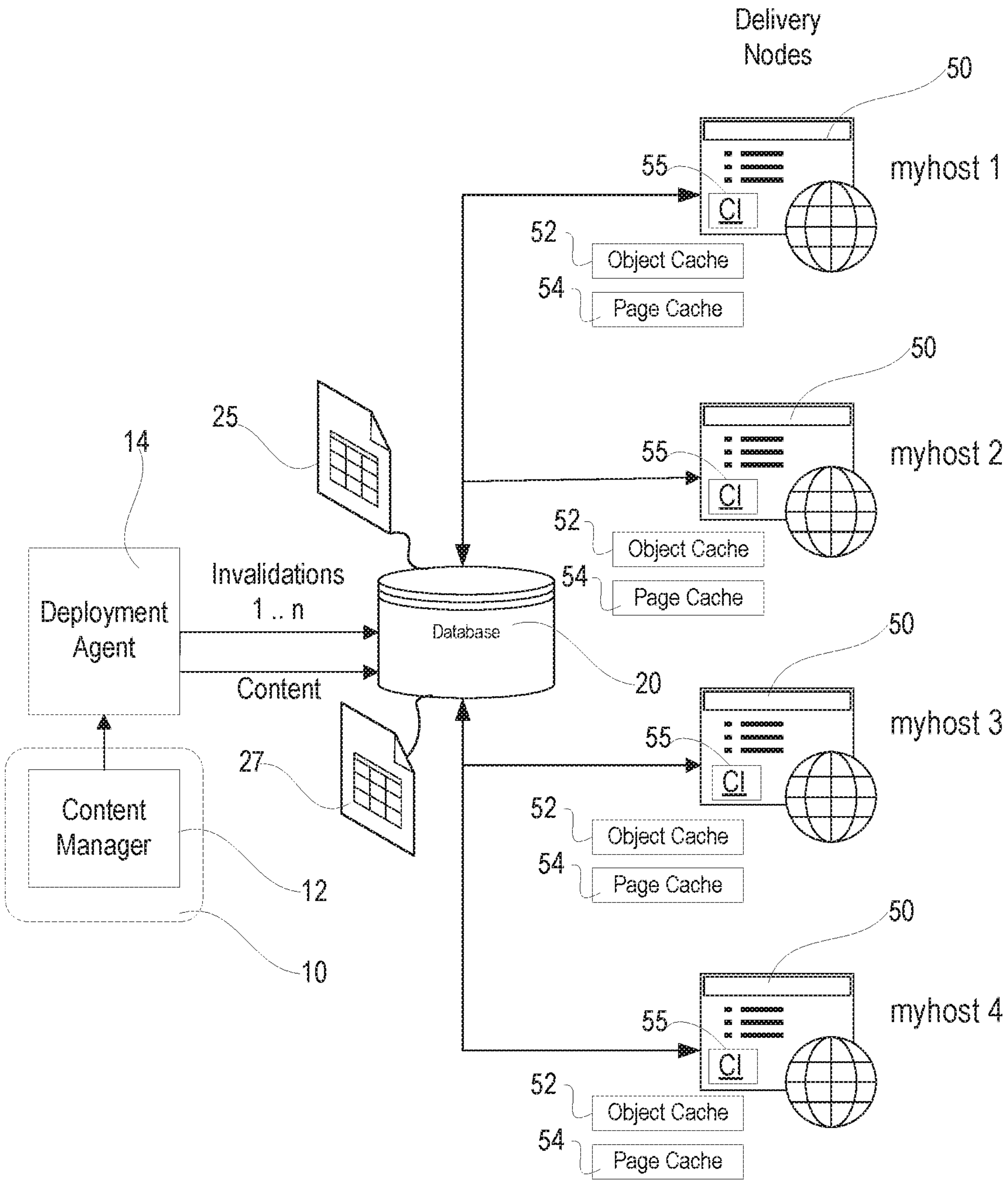
FIG. 1 illustrates one embodiment of a content management and delivery architecture having a first mode of operation.

FIG. 1 is a diagrammatic representation of one embodiment of a content management and delivery architecture comprising a management stage node 10 and delivery stage delivery nodes 50. The management stage node 10 comprises a host machine on which a server application providing application services for a management stage is installed. Management stage node 10 may be part of a cluster of servers distributed among multiple management stage host machines. A delivery node 50 comprises a host machine on which a server application providing application services for a delivery stage is installed. A delivery node 50 may be implemented on the same host machine as management stage node and/or multiple delivery nodes may be implemented on the same host machine. A delivery node 50 may be part of cluster of servers distributed among multiple delivery stage host machines. Delivery nodes 50 can connect to the management stage node 10 via a network transmission channel comprising a local area network (LAN), wide area network (WAN), the internet, or other wired and/or wireless network.

A deployment agent 14 deploys changes from management stage node 10 to delivery nodes 50. Deployment agent 14 may comprise a deployment agent at the management stage node 10, deployment agents at one or more of the delivery nodes 50 or a combination thereof or other deployment agent. Deployment agent 14 stores content and cache invalidations to a database 20 accessible by the delivery nodes 50.

The services for the management stage node 10 include content management services (a content manager 12) to manipulate, tailor, and publish assets for a web site. The website may have a collection of objects, including file assets and non-file assets. Non-file assets can include assets such as users, groups, modules, module types, pages, menus, themes, structures, styles and templates, logon permissions, administrative permissions, site branding, site navigation, instantiated programming language objects, permissions, user preferences and settings. Various content objects may reference file assets including resources such as code including JSP pages, ASP pages, Java classes, ADOs (ActiveX Data Objects), CGI (Common Gateway Interface) code, pure servlet logic, and/or object oriented programming language classes, scripts, such as VP Scripts or JScripts, images including GIF files, and other resources.

Website content may be managed as a set of content items. A content item represents a piece of content, such as a file, record or set of fields in a database, that is managed as a content object. Content items can be stored as content objects in a repository. In some cases, rather than storing the content items, the repository can include references to another system and its corresponding objects or repository. Each content object can have an arbitrary amount of metadata associated with it. For purposes of website management, such metadata may include whether the content object has been approved for publication, whether it was published, or any other information that is useful in classifying the content object for website management. Each instance of an object may include metadata such as: a global unique identifier (GUID), security related information (e.g., access control list), creation date, creator, modification date, modifier, path within a content hierarchy, approval status, publishing status, scheduled publish and unpublish dates and other metadata.

As users of content manager 12 perform operations on content objects (create, update, delete), a deployment agent 14 is notified of the changes and stores the new or updated content objects and records of the operations in database 20. In some embodiments, this involves storing the content management metadata in database 20 and a file referenced in the content management metadata in a file system. If a change to content affects an object that was previously published to the delivery stage, deployment agent 14 registers invalidations in a queue of cache invalidations 25. The cache invalidations correspond to operations that affect content previously published to one or more nodes 50 (e.g., an operation to delete, unpublish, update a content object that was published to nodes 50).

In one embodiment, deployment agent 14 maintains the queue of cache invalidations by storing cache invalidation records in database 20. Each cache invalidation record can identity of a piece of previously published website content (for example by object ID) affected by an operation at management stage node 10. Each cache invalidation record may also include a sequence id (seq_id) indicating when the operation occurred relative to other operations for which cache invalidation records are recorded. In some embodiments, the sequence identifier may include a time stamp. A cache invalidation record may also identify the operation or include other data.

The cache invalidation records may be stored in their own table(s) or may be part of a larger sequence of records. For example, deployment agent 14 may maintain tables of operation records for each operation performed on content (or some set of operations based on rules) with each operation record including the identity of a piece of website content affected by the operation, an indication of the operation, a sequence id and a status. The cache invalidation records may be the records in an operations table that correspond to particular types of operations and/or have a particular status. For example, the cache invalidation records may be those records with a status of "committed," indicating that the operations are to be committed to the delivery stage. In such an embodiment, notifications of operations to modify content also serve as cache invalidations.

A delivery node 50 may include an application server with services to generate and assemble page content (e.g., HTML or other page content) from the website content. In particular, the delivery stage application servers may resolve requests from web browsers to JSPs, ASPs, pure servlets or other code used to dynamically generate a corresponding web page and process the code to generate a web page containing page content. Generating a web page may include assembling a web page from fragments of the web page source that are generated via page code or fragments retrieved from the page cache. As one of ordinary skill in the art will appreciate, a single request from a browser may involve processing a large amount of page code.

Each delivery node 50 can store logic and content used by the delivery stage application server to generate web pages in an object cache 52 and store page content in a page cache 54. In some cases, an object cache may be shared between two nodes. According to one embodiment, an object cache 52 may be a cache in transitory memory (Level 1 caching) persisted to a local disk if desired (Level 2 caching), which reduces the load on the application server and database at the delivery node 50. For example, object cache 52 may keep a number of Java objects in memory so that a database is not used to access website content information, and to reduce the overhead of producing dynamic output based on XSL transformation or JSP logic and code. A delivery node 50 may populate objects in object cache 52 as delivery node 50 uses the objects in the generation of pages or page fragments.

However, as users of content manager 12 perform operations that affect content published to delivery nodes 50, the logic or other website content in object cache 52 may become stale. To prevent or reduce the use of stale objects from object cache 52, delivery nodes may implement a cache invalidator 55 that periodically checks invalidation queue 25 and invalidates objects in object cache 52 based on items in the queue.

More particularly, at installation or other configuration time, the cache invalidator 55 is configured to obtain cache invalidation information received from management stage node 10 by, for example, reading data from database 20. Cache invalidator 55 may also write data to database 20. The cache invalidator 55 checks cache invalidations to determine if there are any cache invalidations that it has not previously processed and, if so, fetches those invalidations and invalidates any objects in the object cache 52 that are invalid based on the invalidations or clears the cache entirely based on the invalidations. This may further result in invalidating entries in the page cache 54 based on dependencies between page content in page cache 54 and objects in object cache 52.

An invalidator 55 can track its progress by populating an invalidation status record. For example, according to one embodiment, invalidator 55 may add entries to an invalidation status table 27. Each invalidation status record may include, for example, an invalidator identifier that distinguishes the node from other nodes, which may be, for example, a delivery node identifier of the corresponding delivery node 50 or an identifier specific to invalidator 55, and the last cache invalidation from queue of cache invalidations 25 successfully processed by the invalidator 55. The last cache invalidation successfully processed may be identified by the sequence id of the last cache invalidation successfully processed by the invalidator 55. The next time an invalidator 55 checks the queue of cache invalidations 25, the invalidator 55 can begin processing invalidations from queue 25 that are after the last processed invalidation indicated in invalidation status table 27 for the corresponding node.

In some embodiments, if there are more than a threshold number of unprocessed cache invalidations after the last processed sequence identifier for the invalidator 55, the invalidator 55 clears the respective object cache 52. The cache invalidator 55 further sets the last processed sequence identifier in the invalidation status for the invalidator 55 to the sequence identifier of the current last invalidation in the invalidation queue 25.

Figure 2:
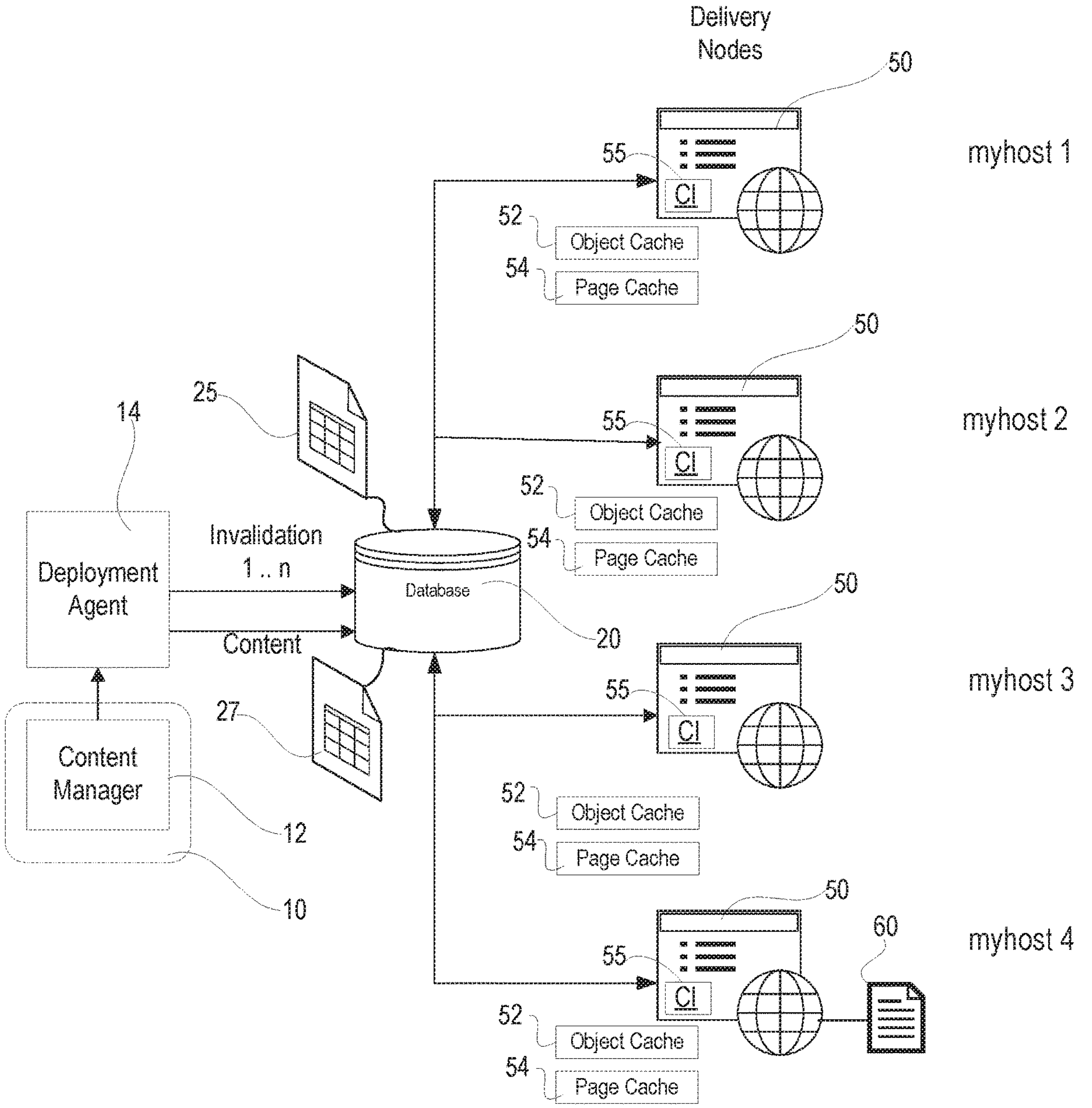
FIG. 2 illustrates an embodiment of a content management and delivery architecture having a second mode of operation.

In some embodiments, database 20 may be a high availability database in which a primary database is replicated to several read only databases. One or more delivery nodes 50 may only have access to a read only copy of database 20 and thus, cannot write an invalidation status to the database 20. According to one embodiment, a cache invalidator at a delivery node may operate in a file tracking mode of operation in which the cache invalidator does not write the invalidation status to the database. FIG. 2 illustrates an embodiment in which a delivery node 50 ("myhost 4") operates in a file tracking mode of operation in which the invalidator 55 of "myhost 4" tracks its invalidation status using file 60 in a file in a local or remote file system. That is, the invalidator 55 of "myhost 4" reads the last processed sequence identifier from and writes the last processed sequence identifier to file 60. The file tracking mode of operation may be used, for example, if the invalidator 55 does not have write access to database 20. While the example of file tracking is used, an invalidator 55 without write access to database 20 may be configured to track its invalidation status in another database or data store to which invalidator 55 does have write access.

Figure 3:
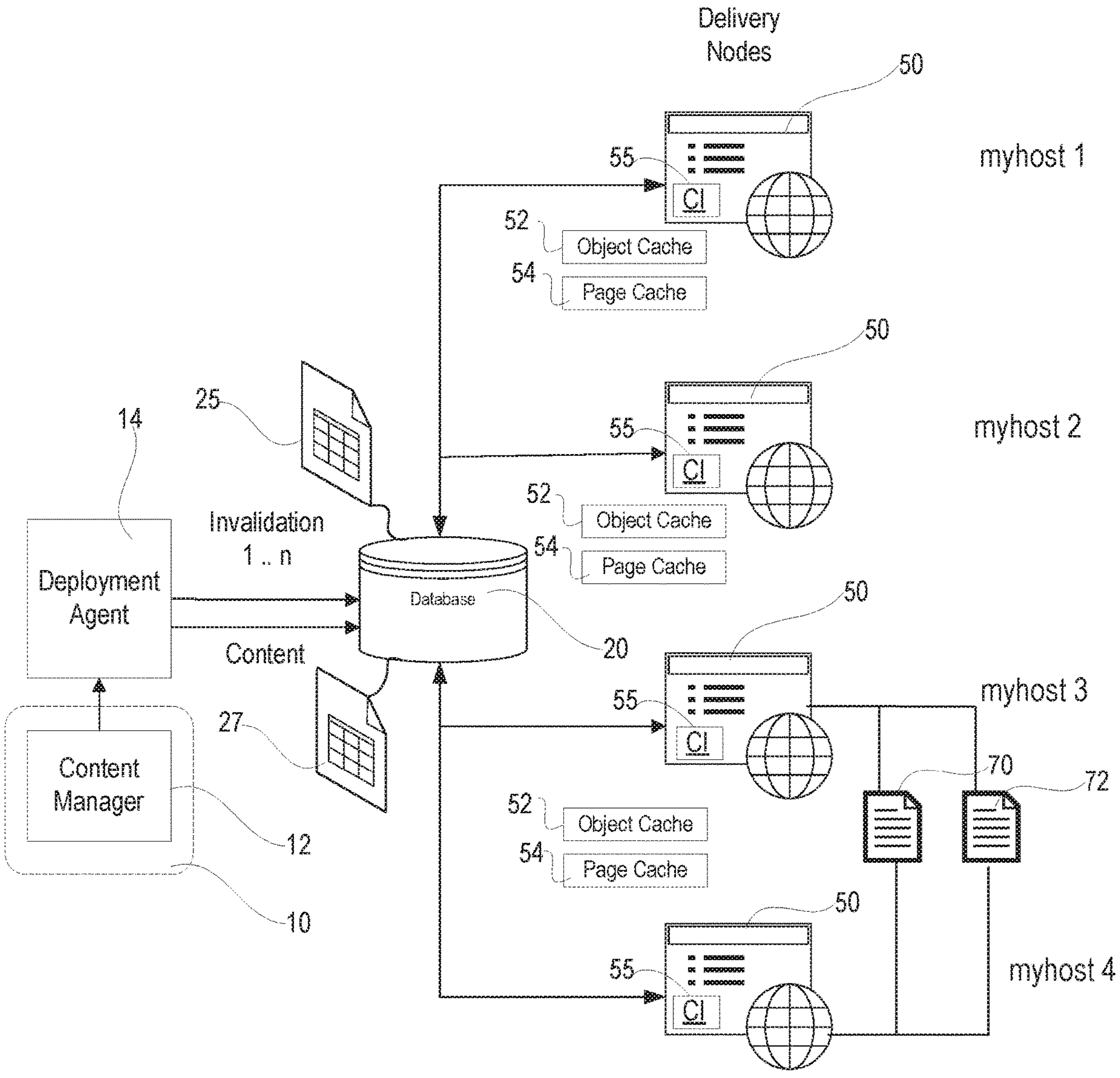
FIG. 3 illustrates an embodiment of a content management and delivery architecture having a third mode of operation.

FIG. 3 illustrates a configuration in which two nodes 50 ("mynode 3" and "mynode 4") share an object cache 52 and the respective invalidators 55 operate in a shared cache mode of operation. In this example, the nodes that share a cache use a lock file 70 to assert a lock on the cache. Only one node may lock the cache 52 at a time and, during that time, other nodes that share the cache 52 will not write to cache 52 or remove items from cache 52. When it is time to poll the queue 25, the cache invalidator 55 of a node 50 sharing a cache 52 (e.g., cache invalidator 55 of "mynode 3" or cache invalidator 55 of "mynode 4") can obtain a lock on the cache 52 using the lock file 70. If the cache invalidator 55 is successful in obtaining the lock, it accesses an invalidation status file 72 used by the cache invalidators 55 of the nodes sharing the object cache 52 to determine the last invalidation processed for the shared cache. The cache invalidator 55 that locked the shared cache processes the invalidations from queue 25 to invalidate entries in the shared cache (or clear the cache entirely), update the invalidation status in invalidation status file 72 and release the lock on the shared cache. In other embodiments, the shared invalidation status may be stored in a database to which each of the nodes 50 sharing a cache has access.

In some embodiments, a cache invalidator 55 may support multiple modes of invalidation operation, such as a default mode, a file tracking mode, a shared cache mode or other modes. The mode of operation can be set via the configuration parameters for the cache invalidator. In other embodiments, a cache invalidator 55 may only support a single mode of invalidation operation.

According to one embodiment, cache invalidations are broadcast to delivery stage nodes 50 using a shared database 20. Management stage node 10 does not require any knowledge about the delivery nodes 50 specifically for cache invalidation purposes and any delivery node 50 configured to access or listen for information from queue 25 can retrieve/receive the cache invalidations from the queue without the management stage directing cache invalidations to specific nodes. Moreover, the broadcast cache invalidation techniques discussed above do not require pre-registration of the delivery nodes 50. Instead, in some embodiments, a delivery node 50 can retrieve cache invalidations regardless of whether it is registered in database 20 for invalidation tracking purposes. Furthermore, a delivery node 50 can auto register itself in database 20 for invalidation purposes by adding an entry to invalidation status table 27. However, in some embodiments, such registration is not required at all as a node may track its own invalidation status (e.g., in file 60, file 72 or a non-management stage database to which the node can write).

Figure 4:
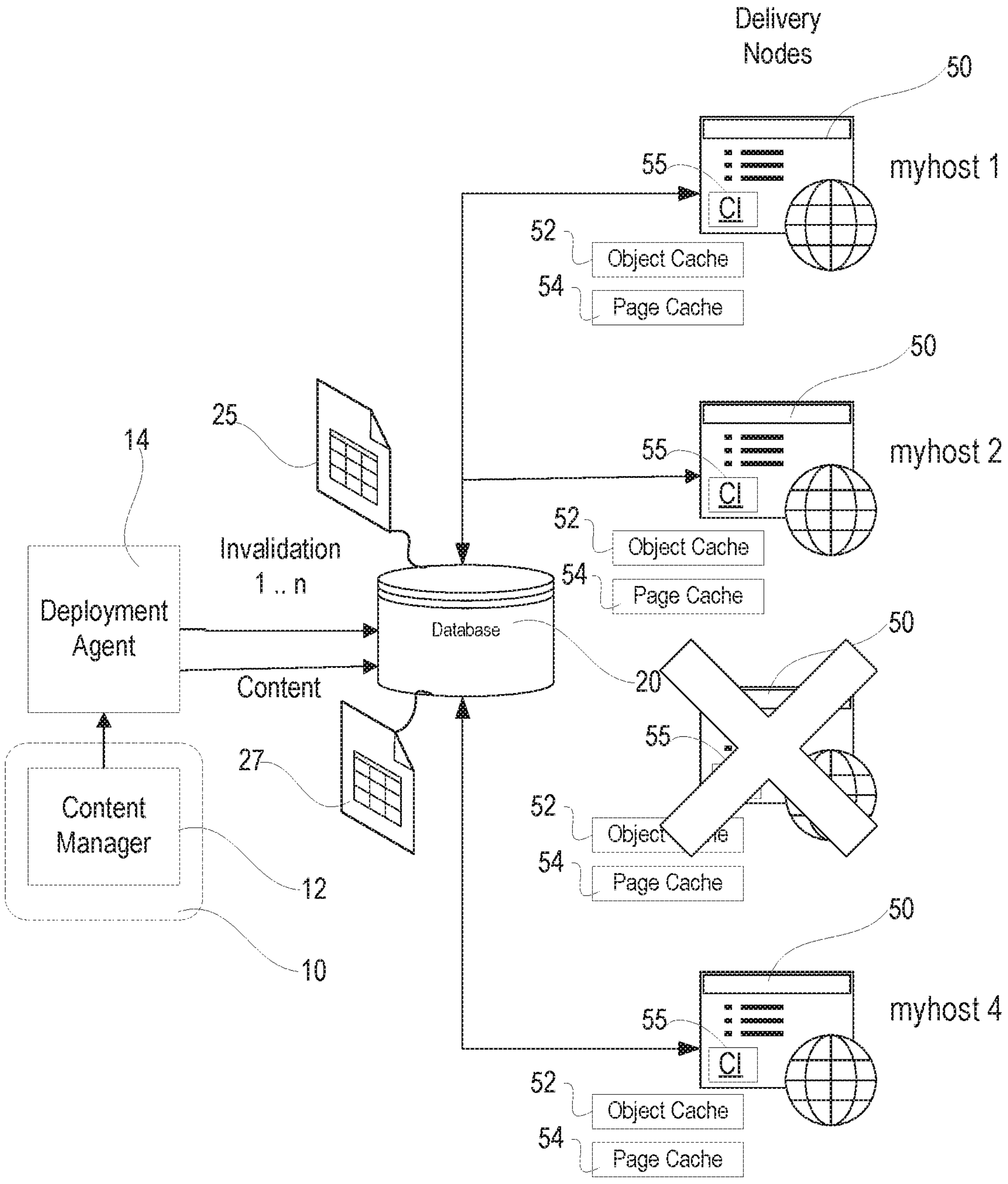
FIG. 4 illustrates an embodiment of a content management and delivery architecture experiencing node failure.

Turning to FIG. 4, embodiments described herein provide an advantage because the failure of one node does not affect the ability of other nodes to receive invalidations. For example, the failure of the "myhost 3" node, does not prevent the "myhost 4" node from receiving and processing invalidations. Moreover, a deployment agent at the management stage node 10 does not have to track, in a delivery node-specific manner, which invalidations have to be retried when a node comes back online. Instead, when the node "myhost 3" is restored, the node can resume processing invalidations from the last processed invalidation in its status in invalidation status table 27. As an additional benefit, new nodes can be more easily added because new nodes do not have to be registered with management stage node 10 to receive invalidations.

Figure 5:
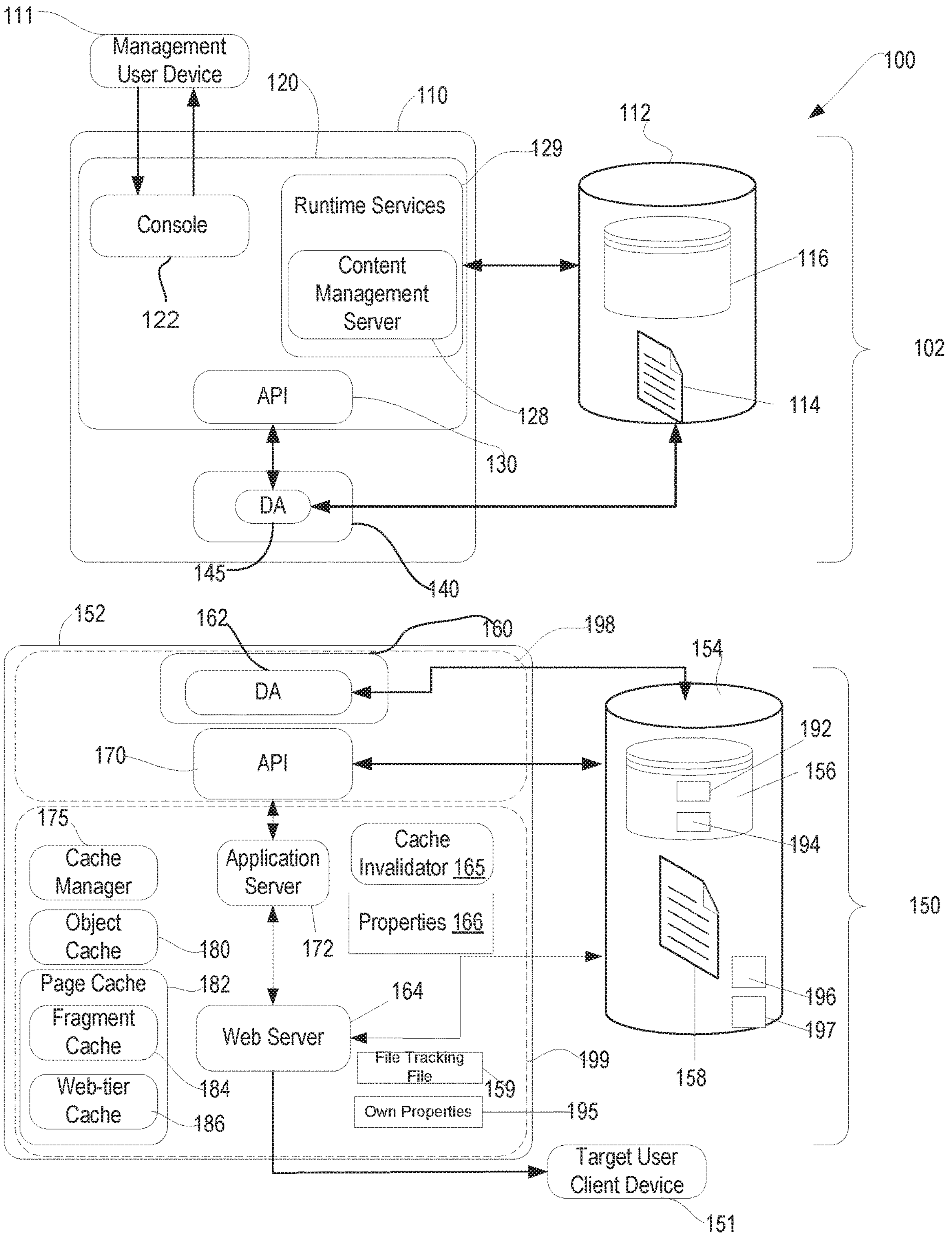
FIG. 5 illustrates another embodiment of a content management and delivery architecture.

A management stage node 10 and delivery nodes 50 may be implemented according to a variety of architectures. FIG. 5, for example, is a diagrammatic representation of another embodiment of a content management and delivery architecture 100 that includes a content management stage 102 at which website assets and updates to the website assets are managed and a delivery stage 150 to deliver the website to a target environment. Delivery stage 150 may be a production stage at which the content is made available to the target audience (e.g., over the Internet, corporate Intranet or other network) or may be an intermediate stage between management stage 102 and the production stage.

Content management system 110 comprises computer-based tools running on one or more server machines for managing editing, creation, lifecycle and staging of content for a website. Content management system 110 may include features for authorized users at one or more client computers 111 to manipulate, tailor, and publish to a web site, such as an internal site (e.g., an intranet), or a user-facing web site, such as a newspaper or ecommerce site, etc. Content and related information managed by content management system 110 may be stored in repository 112 which may comprise one or more storage systems. In one embodiment, files may be stored in a file system 114 and other assets may be stored in a content database 116, though other organizations of assets may also be used. In the illustrated embodiment, content management system 110 includes a content manager 120 that provides a set of content management services to gather, organize and manage content for delivery. Content manager 120 includes one or more consoles 122, a content management server 128, content API 130 and runtime services 129.

Consoles 122 may include configuration consoles, workspaces and management consoles that provide graphical user interfaces (e.g., a web-based interface) that allow administrative users to configure and administer content management system 110 and provides status information, content contributors to create, organize, and manage sites and content, such as adding, approving and managing content. Content management server 128 is responsible for managing assets in repository 112, for example, managing source content in file system 114 and database 116.

In the embodiment illustrated, content management server 128 runs within runtime services 129 that provide a runtime environment with access to services such as application servers, directory services, database drivers and other runtime services. Content management server 128 can track each piece of content, including, for example, tracking which website(s) the piece of content is used in, who created the content, the content's current state and version, labeling of content, etc. As discussed above in conjunction with FIG. 1, website content may be managed as a set of content objects. In accordance with one embodiment, content management system 110 may maintain content management metadata in content database 116 and managed file assets in file system 114.

Content delivery services 140 provide a container for a deployment agent 145. On the management system 110, the content management server 128 notifies deployment agent 145 when content contributors add or change content objects. Deployment agent 145 manages files on the file system 114 and data in database 116 as content contributors create, update, and delete files. Content API 130 provides methods for retrieving content that has been delivered to file system and databases by one or more deployment agents.

Delivery stage 150 provides one or more delivery endpoints for content (e.g., web servers, application servers, databases, or the like). The delivery stage 150 may be a production stage that delivers content to the intended audience, for example, to customers of a live web site, or other stage. The delivery stage may also be an intermediate stage between the management stage and the production stage.

Delivery stage 150 may include multiple nodes, such as a management node 198 and a delivery node 199. While a single management node 198 and delivery node 199 are illustrated, there may be multiple nodes in each system. For example, a single management node 198 store content and cache invalidations to a repository 154 shared or replicated to a plurality of delivery nodes 199. Similarly, although not illustrated, management stage 102 may include multiple management and delivery nodes.

Content delivery system 152 comprises tools running on one or more server machines to provide a website to users at client devices 151. Content delivery system 152 comprises application services 160 that include a deployment agent 162 that deploys website assets to a repository 154. At installation (or other time), deployment agent 162 is configured to communicate with content management system 110 to collect information, such as assets and records from content management system (e.g., via API 130). Deployment agent 162 can deploy assets to databases (e.g., content database 156), file systems (e.g., file system 158) or other systems. Deployment agent 162 may store a record of operations in one or more operations tables in database 156 and updated or new assets, if any, to repository 154.

For records containing an operation that affects an object previously published to delivery stage 150 (e.g., an operation to delete, unpublish, update a content object that was published to delivery stage 150), deployment agent 162 can register cache invalidations in a broadcast cache invalidation queue 192. According to one embodiment, deployment agent 162 maintains the queue of cache invalidations 192 by storing cache invalidation records in database 156. Each cache invalidation record can include the identity of an item (e.g., a piece of website content) affected by an operation at management stage 102 (for example by object ID) previously published to delivery stage 150 and a sequence id (seq_id) indicating when the operation occurred relative to other operations for which cache invalidation records are recorded. In some embodiments, the sequence id may include a time stamp. A cache invalidation record may also identify the operation and include other data.

The cache invalidation records may be stored in their own table(s) or may be part of a larger sequence of records. For example, deployment agent 162 may maintain tables of operation records for each operation performed on content (or some set of operations based on rules) with each operation record including the identity of a piece of website content affected by the operation, an indication of the operation, a sequence id and a status. The cache invalidation records may be the records in an operations table that correspond to particular types of operations and/or have a particular status. For example, the cache invalidation records may be those records with a status of "committed," indicating that the operations are to be committed to the delivery stage.

Broadcast cache invalidation queue 192 may be accessed by a plurality of delivery nodes. As such, cache invalidations can be broadcast to delivery nodes using a shared cache invalidation queue 192.

As discussed below, cache invalidators 165 at each delivery node 199 sharing database 156 (or accessing a replicated copy of database 156) can process invalidations from invalidation queue 192. The delivery nodes 199 are not required to register with management node 198 (or the management stage) to receive invalidations and the management node 198 is not required to direct cache invalidations to specific delivery nodes.

Content delivery system 152 further includes an application server 172 and a web server 164 to respond to and process client requests, to generate web page files for web pages provided to clients (web page in this context can refer to an overall web page or a portion of web page, either of which may be made up of one or more page fragments) and respond to client requests. A delivery API 170 provides methods so that the application server can extract assets from database 156 and file system 158 to generate web pages or portions of the web pages.

Content delivery system 152 may also include a cache management application 175 ("cache manager 175") that may employ several layers of caching to store commonly used assets, fragments of pages or pages. According to one embodiment, assets returned by API 170 are stored in object cache 180. Content delivery system 150 may also maintain a page cache 182, including a fragment cache 184 to store fragments of HTML generated by application server 172 and/or web-tier cache 186 to store assembled pages.

According to one embodiment, object cache 180 may be a cache in transitory memory (Level 1 caching) persisted to a local disk if desired (Level 2 caching), which reduces the load application server 172 and database 156. For example, object cache 180 may keep a number of Java objects in memory so that the database 156 is not used to access content information, and to reduce the overhead of producing dynamic output based on XSL transformation or JSP logic and code.

When a client device 151 requests a web page, application server 172 and web server 164 may operate to provide web pages to users using content from repository 154 or other sources. Web server 164 can access file system 158 to return page files or may pass the request to application server 172, which resolves the request to an existing web page file or generates a web page file having the appropriate content. Generating a web page file may include assembling a web page file from fragments of the web page source that are cached by cache manager 175 or stored in repository 154. Generating the web page file may also include generating new page source.

In general, when a request for a web page is received from a client 151, web server 164 can distribute the request to the appropriate application server(s) 172. The application server 172 may resolve the request to a static page or JSPs, ASPs, pure servlets or other code used to dynamically generate a corresponding web page. The application server processes the code to generate a web page containing page content. As part of processing a request, the application server 172 may determine if a previously generated page or one or more fragments for the web page are in the page cache 182. If the previously generated web page is in the page cache 182, the web page may be returned. If an appropriate web page fragment is in the page cache 182, the application server 172 can retrieve the web page fragment from page cache 182. For web page fragments not in page cache 182, the application server 172 determines if the assets needed to service the request are in the object cache 180 and, if so, retrieves the assets from object cache 180. The retrieved assets can be used by a page generator of application server 172 to generate the appropriate source (e.g., HTML fragments). If one or more assets needed to service the request are not in the object cache 180, application server 172 can request the assets via API 170 and generate the appropriate source using the returned assets. Application server 172 further forwards any assets returned via API 170, fragments generated and dependencies between assets and fragments to cache manager 175. Cache manager 175 stores the assets in object cache 180, the fragments in fragment cache 184 and the dependencies in a dependency database. Application server 172 assembles the responsive web page file for the requested web page using fragments retrieved from fragment cache 184 and/or generated using assets retrieved from object cache 180 or from the repository and returns the web page file to web server 164 for distribution to the client 151. The returned page may be cached, in some embodiments, in web-tier cache 186.

As the logic and content used to generate page fragments and pages is updated or unpublished, object cache 180 may become stale. To prevent or reduce the use of stale objects from object cache 180, content delivery system 152 may implement a cache invalidator 165 that periodically checks cache invalidations queue 192 and clears the cache based on the items in the queue. According to one embodiment, cache invalidator may be implemented as a service at a delivery node. In some embodiments, cache invalidator 165 may be implemented as its own thread by a processor.

An invalidation status for the cache invalidator 165 may be stored in an invalidation status table 194 in database 156, a file 159 at delivery system 152 (e.g., in a local file system) or a shared file 197 for a shared cache. Cache invalidator 165 may also store an invalidation status in other databases or file systems. In a shared cache mode of operation, cache invalidator 165 may maintain an own lock file properties file 195 to track properties for cache invalidator 165. The cache invalidator may further access a shared lock file 196 and a shared cache invalidation status file 197 in a directory location shared by multiple nodes (e.g., in a location in a shared network file system).

The cache invalidator 165 may be customized for a delivery system 152 through setting cache invalidator properties 166 at installation or other time. Some examples of invalidator properties 166 include, but are not limited to:

cacheInvalidationService.processorName: A unique id for the cache invalidator. According to one embodiment, if the processor name property is not specified, the cache invalidator will generate a processor name based on the name/IP address or other property of the content delivery system/node.

cacheInvalidationService.pollingPeriod: specifies how long for the cache invalidator to wait before checking for new items in the queue.

cacheInvalidationService.batchSize: specifies how many items the cache invalidator is to process in each batch. According to one embodiment, the cache invalidator processes all cache invalidations in the queue at the time the queue is checked, breaking the invalidations into small batches based on the batch size to process. Progress is saved by storing a last processed sequence identifier in a database or file after each batch is processed. Consequently, if the delivery node 199 fails, cache invalidator 165 does not start at the beginning of the queue, but where it left off.

cacheInvalidationService.maxQueueThreshold: specifies the maximum number of queued items the cache invalidator is to process when starting. If the number of invalidations in the invalidation queue that were not processed by the cache invalidator exceeds this, the cache invalidator will communicate with the cache manager to clear the cache and the cache invalidator will start processing from the end of the queue.

cacheInvalidationService.sharedCache: specifies if the cache invalidator is processing invalidations for a shared cache. If sharedCache is true, this indicates that nodes share the same cache. According to one embodiment, when sharedCache is true, the cache invalidator 165 will only clear the cache when it can obtain a lock (using a.lock file). Once the cache invalidator 165 has the lock, it can clear the cache and update a .lastProcessed file before releasing the lock.

cacheInvalidationService.fileTracking: specifies if the service will use file tracking instead of database tracking to track the last processed sequence identifier for a node.

cacheInvalidationService.sharedCacheMaxDelay: Specifies the maximum amount of time (in milliseconds) that a cache invalidator 165 using a shared cache should wait before force obtaining a lock on the cache.

cacheInvalidationService.stateDirectory: Specifies the directory to store status files when fileTracking=true or sharedCache=true. The cache invalidator 165 must have write permissions to this directory. According to one embodiment, the .stateDirectory defaults to the parent directory of the cache directory. A cache invalidator can be configured to store various types of files using particular filenames in the directory indicated by stateDirectory.

The cache invalidator code can be preconfigured to access a database storing cache invalidations to read cache invalidations and store an invalidation status (if fileTracking is not enabled). In another embodiment, the database may also be a property that can be set via properties 166.

Figure 6:
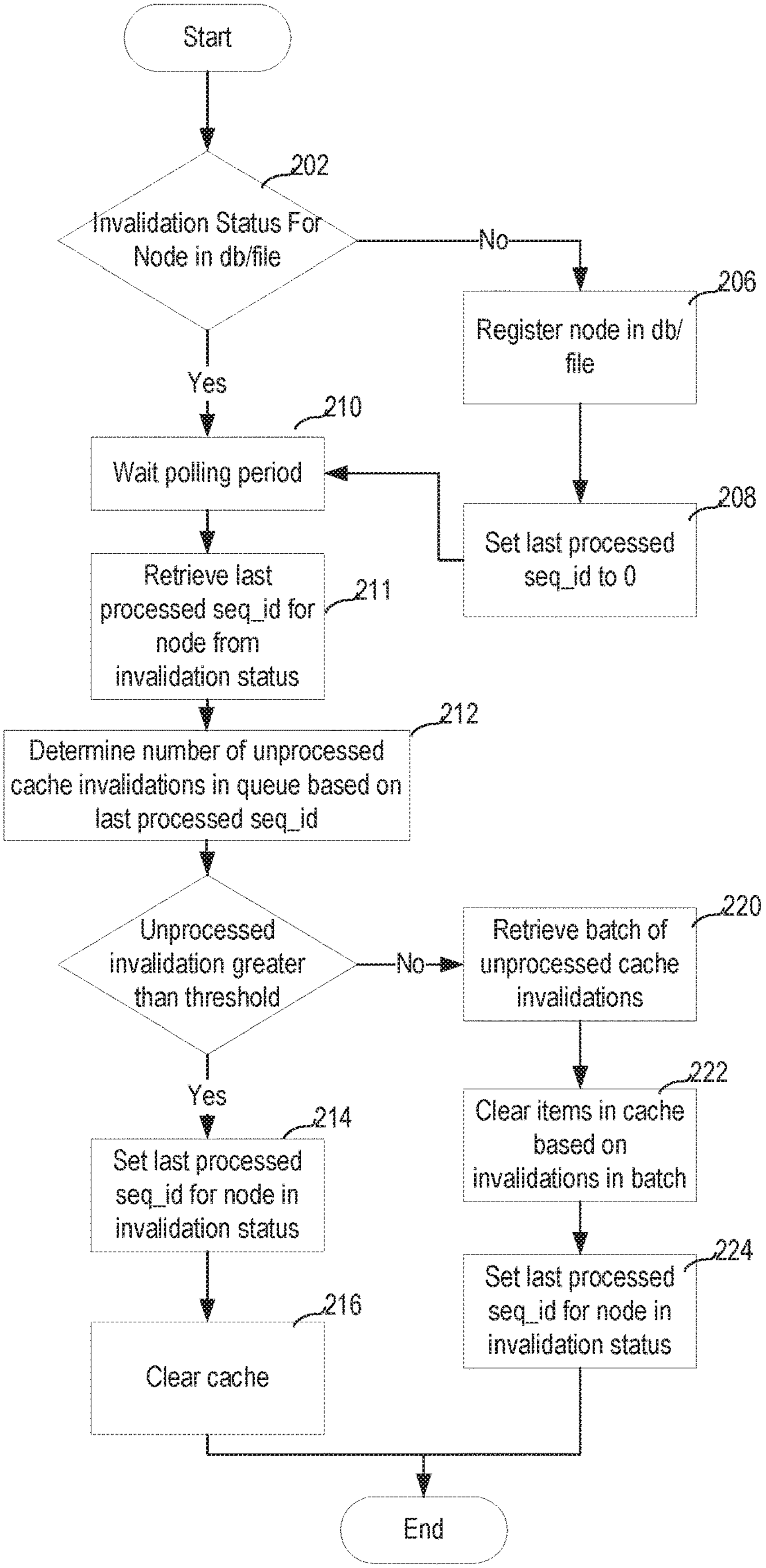
FIG. 6 is a flow chart illustrating one embodiment of a cache invalidation process.

FIG. 6 is a flow chart illustrating one embodiment of a cache invalidation method that can be implemented by a cache invalidator, such as a cache invalidator 55, 165, at a delivery node. At startup, the cache invalidator can determine if an invalidation status has been recorded for the respective delivery node in a database (e.g., database 20, database 156) or, if a file tracking mode has been enabled, a respective invalidation status file (e.g., invalidation file 60, invalidation file 159) or other invalidation status source (202). Based on a determination that there is not an invalidation status for the node in the database or file, the cache invalidator creates an invalidation status for the node (206) in the database or file and sets the last processed seq_id to 0 (208). The cache invalidator may wait a polling period to process invalidations from invalidation queue (e.g., invalidation queue 25, 192) (210).

The cache invalidator retrieves the last processed seq_id from the invalidation status (211) and determines the number of cache invalidations in the invalidation queue (e.g., invalidation queue 25, 192) that have not been processed by the cache invalidator for that delivery node ("unprocessed invalidations") (212). The number of unprocessed invalidations may be the number of invalidations having sequence ids greater than the last processed seq_id retrieved from the invalidation status for the node. If the number of unprocessed invalidations is greater than a threshold, the cache invalidator can set the last processed seq_id in the invalidation status for the node to the seq_id of the current last invalidation in the invalidation queue (214) and clear the delivery node's object cache (e.g., object cache 52, 180) (216). The last process seq_id is stored in an invalidation status table (e.g., invalidation status table 27, 192), invalidation status file or other status store.

In another embodiment, the cache invalidator can log a warning rather than clearing the queue and allow the node to continue with the potentially out of date cache. Some users may choose to allow degraded operation until an off-hours time when cache clearing is less likely to affect overall performance.

Based on a determination that the number of unprocessed invalidations is less than or equal to the threshold, the cache invalidator retrieves a batch of invalidations from the invalidation queue (220), clears items from the node's object cache based on the items referenced in the invalidations in the batch (222) (e.g., based on object id or other identifier), and sets a last processed seq_id to the sequence id of the last invalidation in the batch (224). The last process seq_id is stored in an invalidation status table (e.g., invalidation status table 27, 192), invalidation status file or other status store. Steps 220-224 may be repeated until all the last processed invalidations identified in 212 have been processed.

The embodiment of FIG. 6 is provided by way of illustration. One or more steps of FIG. 6 may be repeated as needed or desired, additional steps practiced, steps practiced in other orders and steps omitted.

Figure 7:
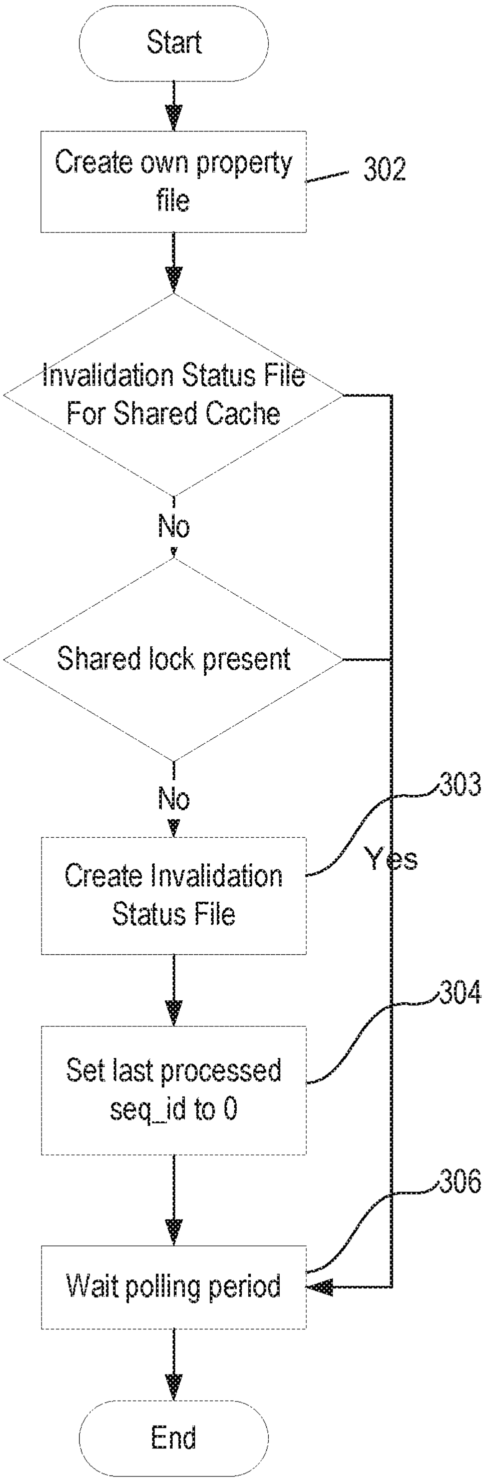
FIG. 7 is a flow chart illustrating another embodiment of a cache invalidation process.

FIG. 7 is a flow chart illustrating one embodiment of an initialization process of a cache invalidator (e.g., cache invalidator 55, 165) at a delivery node that shares an object cache with another delivery node. The cache invalidator may be configured with a directory location for a shared cache invalidation status file and a lock file. At 302, the cache invalidator creates an own lock file properties file for the node (e.g., an own lock file properties file 195). The cache invalidator further creates a shared invalidation status (e.g., using shared invalidation status file 72, invalidation status file 197 or other shared invalidation store) (303) if the cache invalidator does not locate a shared invalidation status for the shared cache and a shared lock file is not present. The cache invalidator sets the last processed seq_id to 0 in the status (304) and waits a polling period to process the invalidations queue (306).

The embodiment of FIG. 7 is provided by way of illustration. One or more steps of FIG. 7 may be repeated as needed or desired, additional steps practiced, steps practiced in other orders and steps omitted.

Figure 8:
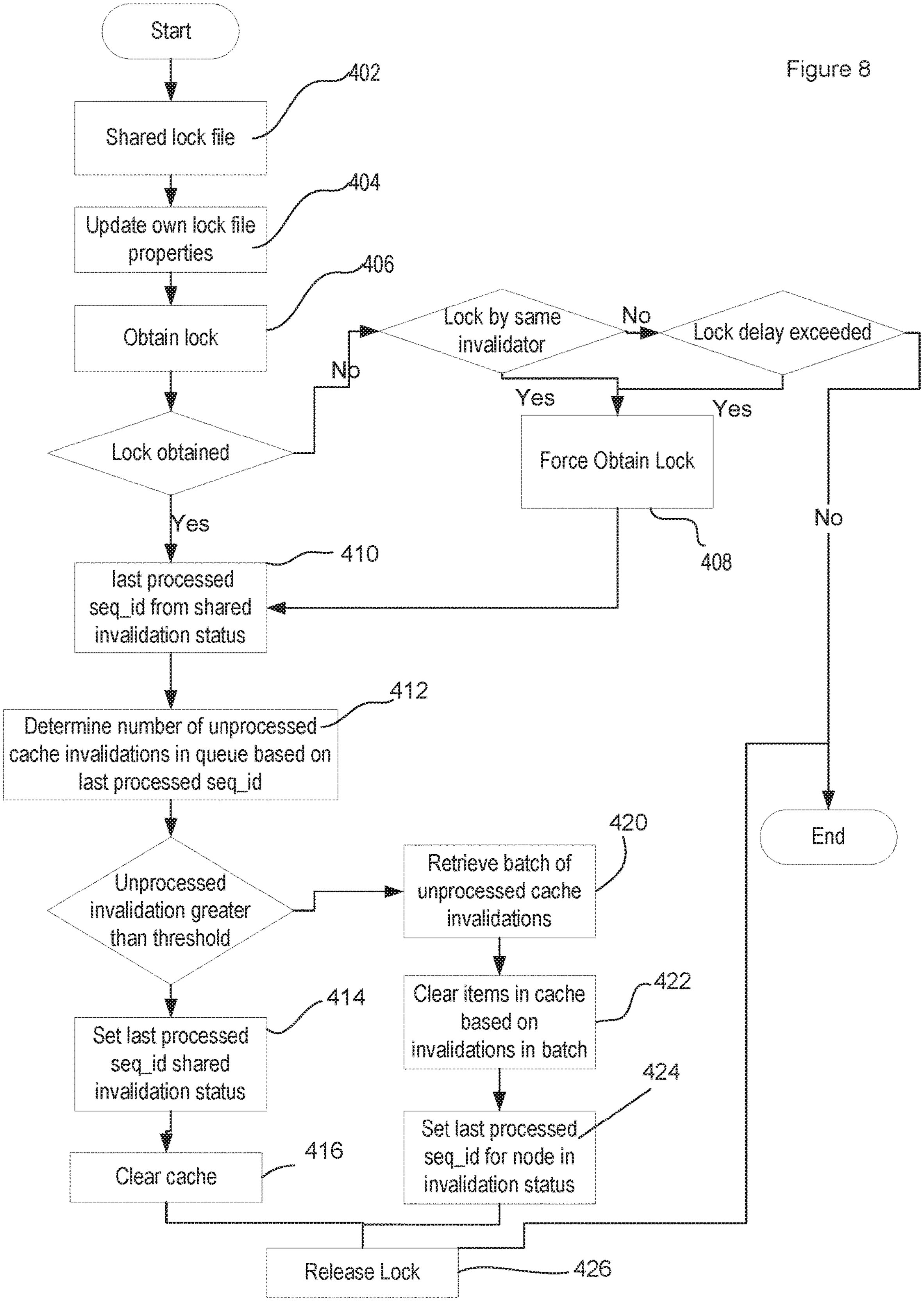
FIG. 8 is a flow chart illustrating yet another embodiment of a cache invalidation process.

FIG. 8 is a flow chart illustrating one embodiment of a process of a cache invalidator (e.g., cache invalidator 55, 165) at a node sharing an object cache. The cache invalidator checks if there is a shared lock (e.g., checks for a shared lock file 70, 196) (402) in a configured directory location and updates its own lock file properties (404) (e.g., in the own lock file properties 195). The shared lock file may include information such as the identity of the cache invalidator (node) asserting a lock on the shared cache. The cache invalidator attempts to obtain a lock on the shared cache (406). If a lock is already asserted on the shared cache by the same node or if the lock has been in place greater than a threshold amount of time, the cache invalidator can force obtain a lock on the cache (408). For example, the cache invalidator can remove the existing lock and assert a new lock.

When a lock is obtained by the cache invalidator, the cache invalidator retrieves the last processed seq_id from the shared invalidation file (410) and determines the number of cache invalidations in the invalidation queue that have not been processed by cache invalidator for that delivery node (412). The number of unprocessed invalidations may be the number of invalidations having sequence ids greater than the last processed seq_id for the delivery node retrieved from the invalidation status. If the number of unprocessed invalidations is greater than a threshold, the cache invalidator 55 can set the last processed seq_id in the shared invalidation status to the seq_id of the current last invalidation in the invalidation queue (414) and clear the shared object cache (416).

Based on a determination that the number of unprocessed invalidations is less than or equal to the threshold, the cache invalidator can retrieve a batch of invalidations from the management stage database (420), clear items in the shared object cache based on the items referenced in the invalidations in the batch (422) (e.g., based on object id or other identifier), and set a last processed seq_id in the shared invalidation status to the sequence identifier of the last invalidation in the batch (424). When the previously unprocessed cache invalidations have been processed, cache invalidator releases the lock (426). This may include copying properties from its own lock file properties to the shared invalidation status (e.g., file 72, file 197) or other shared invalidation status store) and deleting the shared lock file.

The embodiment of FIG. 8 is provided by way of illustration. One or more steps of FIG. 8 may be repeated as needed or desired, additional steps practiced, steps practiced in other orders and steps omitted.

Figure 9B:
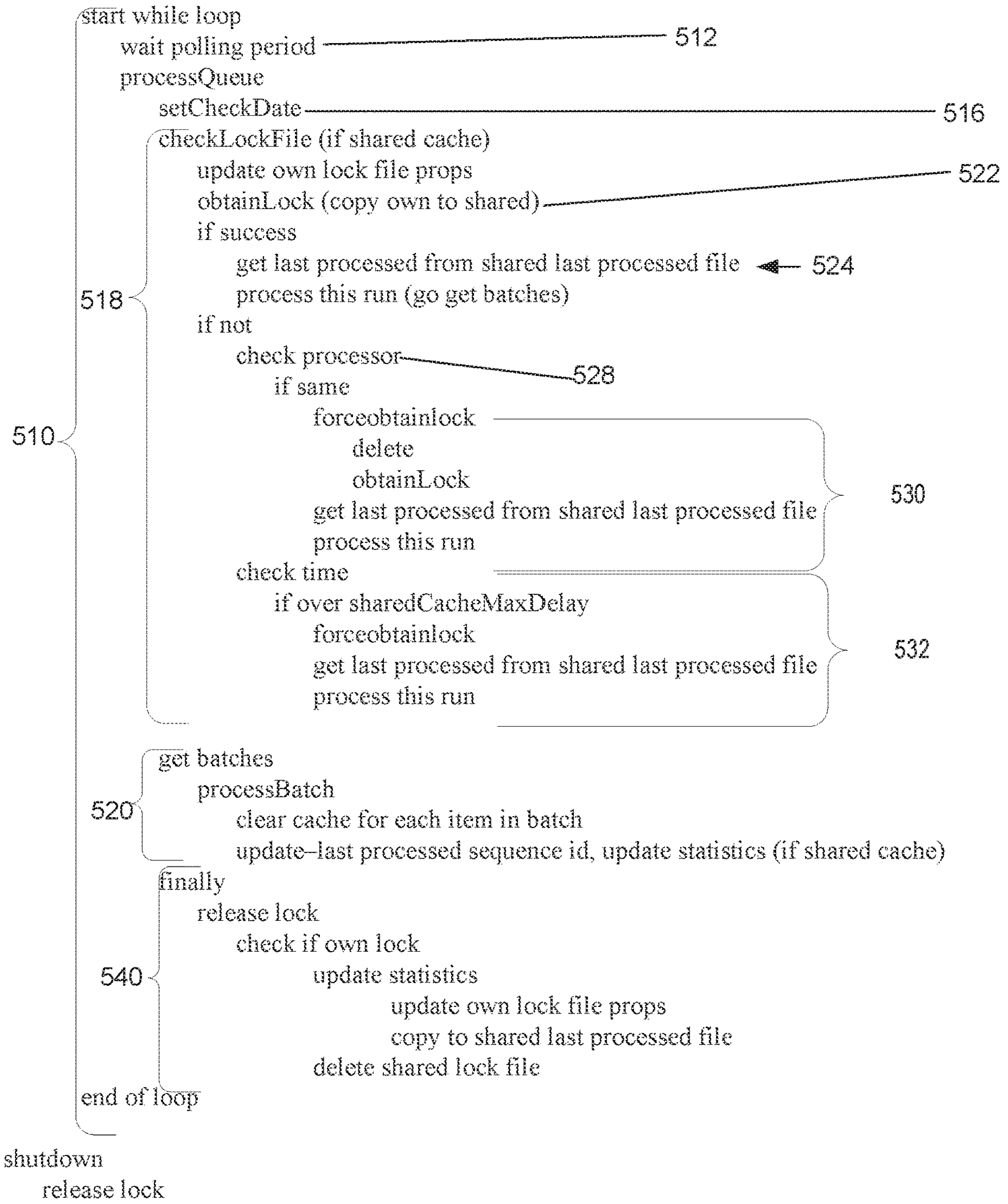

FIG. 9A and FIG. 9B illustrate one embodiment of pseudocode for a cache invalidator service. The cache invalidator uses invalidator properties 500 read from storage or generated by the cache invalidator.

The cache invalidator may check certain preconditions to determine if the cache invalidator should run (501). For example, the cache invalidator may not run if certain other services are running, the node is a management node or other preconditions are met.

If sharedCache or fileTracking=True, the cache invalidator determines if it can write to the file path specified by the stateDirectory property (502). If not, an error can be generated.

At 504, the cache invalidator confirms that it can generate a unique processor name if a processor name is not already specified by the cache invalidator properties. If the cache invalidator cannot generate a processor name, an error is generated. Otherwise, the cache invalidator can generate a unique name for the cache invalidator service.

Portion 506 illustrates an example startup process for a non-shared cache mode of operation. If fileTracking=False, the cache invalidator determines if there is a cache invalidation status entry in the database for the respective node on which the cache invalidator runs. For example, the cache invalidator determines if an invalidation status table includes a row with the processorName. If there is a cache invalidation status entry for the node in the database, the cache invalidator reads the last processed seq_id for the node (e.g., the last processed seq_id associated with the processorName). If not, the cache invalidator registers with the database by, for example, adding a row to the invalidation status table including the processorName value and store an indication that last processed seq_id=0.

If fileTracking=True the cache invalidator determines if there is an invalidation status file for the respective node in the directory specified by stateDirectory. If there is a cache invalidation status file for the node, the cache invalidator reads the last processed seq_id for the node from the file. Based on a determination that there is not an invalidation status file for the respective node, the cache invalidator can create an invalidation status file for the node in the directory specified by the stateDirectory property. For example, the cache invalidator may create a file with the processorName in the filename or body and store and indication that last processed seq_id=0 in the body.

Further, the cache invalidator accesses the invalidation queue and determines the number of cache invalidations in the invalidation queue that have not been processed. If the number of unprocessed invalidations is greater than the threshold specified by maxQueueThreshold, processing proceeds to portion 510. If the number of unprocessed invalidations is greater than the threshold specified by maxQueueThreshold, the cache invalidator sets the last processed seq_id in the invalidation status for the node to the seq_id of the current last invalidation in the invalidation queue. The cache invalidator may signal a cache manager to clear the entire object cache. Processing proceeds to portion 510.

Portion 508 illustrates a startup process when sharedCache=True. The cache invalidator creates a file for its own file lock properties in the directory specified by the stateDirectory property. For example, the cache invalidator can create a properties file with the ProcessorName in the filename or body. In some embodiments, the properties file may include some of the configuration of the cache invalidator to make the configuration easier to access during execution. According to one embodiment, each node participating in a shared cache will have its own lock file properties file.

Further, the cache invalidator determines if there is a shared cache invalidation status file and a shared lock file in the directory specified by the stateDirectory property. If there is a shared cache invalidation status file or a shared lock file in the directory specified by the stateDirectory property, processing proceeds to portion 510. If there is no shared cache invalidation status file and no shared lock file, the cache invalidator creates a shared cache invalidation status file in the directory and sets the last processed seq_id in the shared cache status invalidation file to 0. Processing proceeds to portion 510.

Turning to loop 510, at 512, the cache invalidator waits the polling period specified by pollingPeriod (e.g., 5000 milliseconds in the example properties of FIG. 9A) and then begins processing invalidations from the invalidation queue.

At 516, the cache invalidator sets a current date and time as a last checked date indicating the last date the invalidator checked the invalidation queue. The last checked date may be maintained in volatile memory, file or database. Processing proceeds to portion 518 for a shared cache mode of operation or 520 for a non-shared cache mode of operation.

At 522, the cache invalidator updates its own lock file properties file by, for example, updating the last checked date in the cache invalidator's own lock file properties file. At 522, the cache invalidator attempts to obtain a lock on the cache. For example, the cache invalidator can attempt to copy (e.g., move and rename) its own lock file properties file to the directory location for the shared lock file using a defined shared lock file name as the target. If the shared lock file already exists, the copy will fail and the cache invalidator can proceed to 528. If there is no lock on the cache, the cache invalidator's own properties file is successfully copied as the shared lock file. It can be noted that the shared lock file will now include the identity of the cache invalidator that set the lock and last checked date set by the cache invalidator at 516. At 524, the cache invalidator further accesses the shared cache invalidation status file, reads the last processed sequence identifier and proceeds to portion 520.

At 528, the cache invalidator checks the processor name associated with the shared lock file (e.g., processor name in the shared lock file) to determine if it matches the processor name for that cache invalidator (e.g., matches the value of the processorName property). If the processor name associated with the shared lock file is the same as the processor name of the cache invalidator checking the processor name, this indicates that the cache invalidator already holds the lock. This situation may occur, for example, if the cache invalidator failed before releasing the lock or an error condition occurred. If the cache invalidator already holds the lock, the cache invalidator can force the lock at 530. If the cache invalidator does not hold the lock, processing proceeds to portion 532.

At portion 530, the cache invalidator force obtains the lock. The cache invalidator, according to one embodiment, deletes the existing shared lock file and makes a copy of its own lock file properties file as the shared lock file. The cache invalidator further accesses the shared cache invalidation status file, reads the last processed sequence identifier and proceeds to portion 520.

At portion 532, the cache invalidator reads the last checked time from the shared lock file and determines if the sharedCacheMaxDelay has been exceeded from the last checked date in the shared lock file. Based on a determination that the sharedCacheMaxDelay has not been exceeded the cache manager returns to the start of loop 510. Based on a determination that sharedCacheMaxDelay has been exceeded, the cache invalidator force obtains a lock on the cache. The cache manager deletes the prior shared lock file and stores a copy of the cache invalidator's own lock file properties file (e.g., containing the processor name and last checked date from the cache invalidator's own lock properties file) as the shared lock file. The cache manager further obtains the last processed seq_id from the shared invalidation status file and proceeds to portion 520.

At portion 520, the cache invalidator obtains and processes batches of invalidations after the last processed seq_id in sequence order. For each invalidation entry in a batch, the cache invalidator signals a cache manager to clear an object identified in the invalidation from the cache. The cache invalidator updates the last processed sequence identifier after each invalidation is processed or after a batch is processed. The cache invalidator may hold the updated last processed sequence identifier in memory for the subsequent operations. For a non-shared cache mode of operation, the cache invalidator stores the updated last processed sequence identifier in the invalidation status table or file and returns to the start of loop 510. For a shared cache mode of operation, processing proceeds to portion 540.

At portion 540, the cache invalidator releases the lock. The cache invalidator confirms the shared lock file represents a lock by that cache invalidator (for example, based on the processor name in the shared lock file). If not, an error can be generated. If the shared lock file represents the cache invalidator's own lock, the cache invalidator updates its own lock file properties with last processed seq_id and copies the last processed seq_id to the shared invalidation status file. If the last processed sequence identifier cannot be copied to the last processed file, the cache invalidator can generate an error. If the shared lock file represents a lock by the cache invalidator and the last processed sequence identifier is successfully copied to the shared invalidation status file, the cache invalidator deletes the shared lock file. Processing can return to the start of loop 510.

As further illustrated, during a shutdown sequence the invalidator can release any remaining locks.

Figure 10:
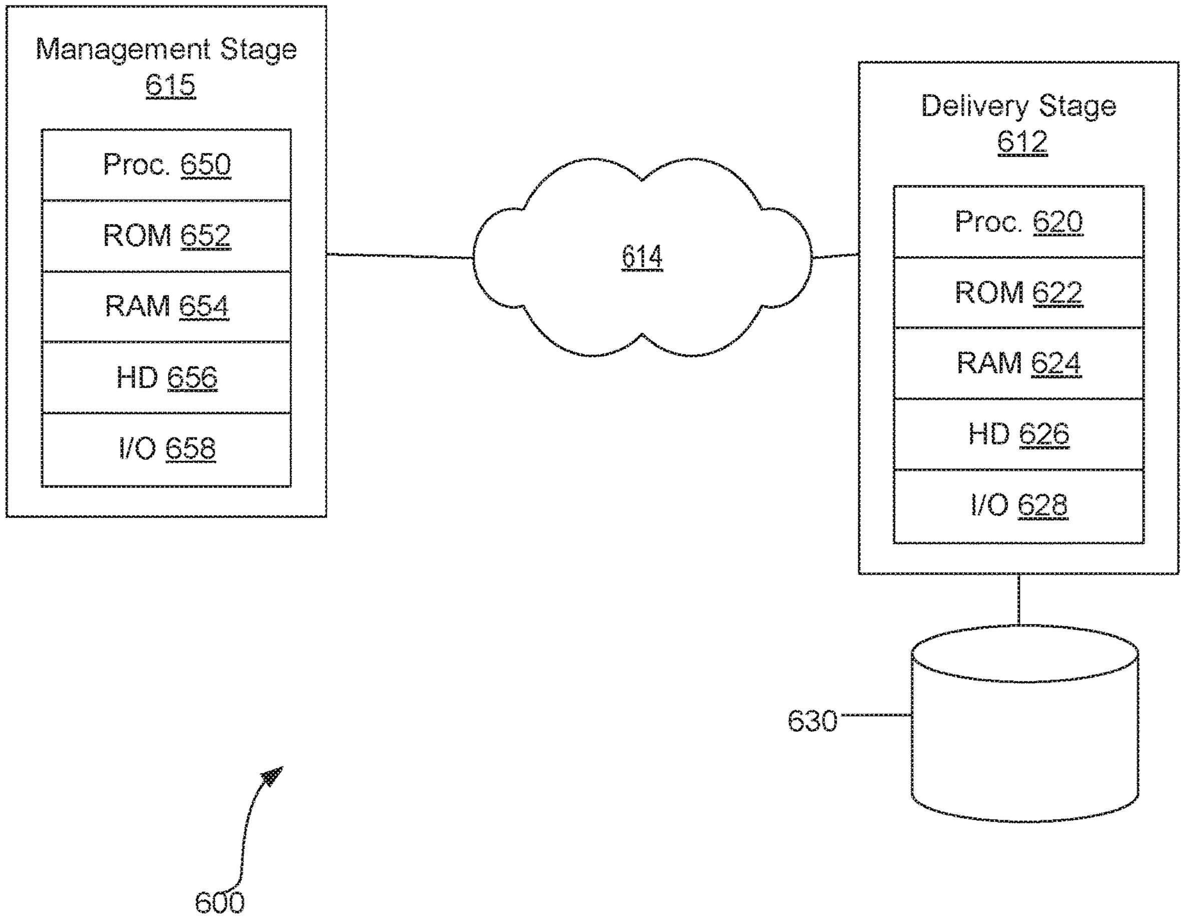
FIG. 10 illustrates one embodiment of a distributed network environment.

FIG. 10 depicts a diagrammatic representation of a distributed network computing environment where embodiments disclosed can be implemented. In the example illustrated, network computing environment 600 includes network 614 that can be bi-directionally coupled to computer 612 and computer 615. Network 614 may represent a combination of wired and wireless networks that network computing environment 600 may utilize for various types of network communications known to those skilled in the art.

For the purpose of illustration, a single system is shown for each of computer 612 and computer 615. However, with each of computer 612 and computer 615, a plurality of computers (not shown) may be interconnected to each other over network 614. For example, a plurality of computers 612 and a plurality of computers 615 may be coupled to network 614.

Computer 612 can include central processing unit ("CPU") 620, read-only memory ("ROM") 622, random access memory ("RAM") 624, hard drive ("HD") or storage memory 626, and input/output device(s) ("I/O") 628. I/O 628 can include a keyboard, monitor, printer, electronic pointing device (e.g., mouse, trackball, stylus, etc.), or the like. Computer 612 is coupled to a repository 630 comprising one or more databases and one or more file systems to store objects received from computer 615. Computers 612 may include data processing systems to provide delivery nodes implementing cache invalidators.

Computer 615 may be similar to computer 612 and can comprise CPU 650, ROM 652, RAM 654, HD 656, and I/O 658. Many other alternative configurations are possible and known to skilled artisans. User computer 615 may include data processing systems to implement management stage nodes.

Each of the computers in FIG. 10 may have more than one CPU, ROM, RAM, HD, I/O, or other hardware components. For the sake of brevity, each computer is illustrated as having one of each of the hardware components, even if more than one is used. Each of computers 612 and 615 is an example of a data processing system. ROM 622 and 652; RAM 624 and 654; and HD 626 and 656; can include media that can be read by CPU 620 or 650. Therefore, these types of memories include non-transitory computer-readable storage media. These memories may be internal or external to computers 612 or 615.

Portions of the methods described herein may be implemented in suitable software code that may reside within ROM 622 or 652; RAM 624 or 654; or HD 626 or 656. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

The processes described herein may be implemented in suitable computer-executable instructions that may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like. In some embodiment, the computer-executable instructions may be stored as software code components on a direct access storage device array, magnetic tape, floppy diskette, optical storage device, or other appropriate computer-readable medium or storage device.

Functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Any suitable programming language can be used to implement the routines, methods or programs of embodiments of the invention described herein. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be implemented using any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain a program for use by or in connection with the instruction execution system, apparatus, system or device. The computer-readable medium can be, by way of example only but not by limitation, an electronic, magnetic, optical, electromagnetic, or semiconductor system, apparatus, system, device, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

What is claimed is:

1. A cache invalidation system comprising:

a repository configured to store objects which are publishable to a plurality of nodes;

an object cache configured to cache objects retrieved from the repository by a first node of the plurality of nodes;

a memory configured to store a broadcast cache invalidation queue shared by the plurality of nodes;

a processor coupled to the memory; and a computer readable medium storing computer-executable instructions executable by the processor to:

receive notifications of operations that affect objects in the repository;

store cache invalidations corresponding to the operations in the broadcast cache invalidation queue, the cache invalidations identifying objects affected by the operations, each cache invalidation in the broadcast cache invalidation queue having a corresponding sequence identifier;

store an invalidation status usable by the first node to identify, from the broadcast cache invalidation queue, a last processed invalidation that was processed with respect to invalidating objects in the object cache, the invalidation status comprising a first corresponding sequence identifier corresponding to the last processed invalidation;

access, by the first node, the invalidation status to determine the first corresponding sequence identifier corresponding to the last processed invalidation;

determine, by the first node, a set of unprocessed invalidations from the broadcast cache invalidation queue that have corresponding sequence identifiers that are subsequent to the first corresponding sequence identifier determined from the invalidation status;

process, by the first node, the set of unprocessed invalidations to clear cached objects from the object cache; and based on processing the set of unprocessed invalidations to clear cached objects from the object cache, update the invalidation status with a second corresponding sequence identifier, the second corresponding sequence identifier corresponding to a last invalidation from the set of unprocessed invalidations.

2. The system of claim 1, wherein the computer-executable instructions are further executable to:

run in a selected mode of operation selected from a first mode of operation and a second mode of operation, wherein in the first mode of operation the invalidation status is stored in a database and in the second mode of operation the invalidation status is stored in an invalidation status file.

3. The system of claim 1, wherein the memory is further configured to store a threshold and the computer-executable instructions are executable to:

based on a determination that a number of invalidations in the set of unprocessed invalidations exceeds the threshold, clear the entire object cache.

4. The system of claim 1, wherein the computer-executable instructions are executable to:

obtain the set of unprocessed invalidations from the broadcast cache invalidation queue; and clear a set of cached objects referenced in the set of unprocessed invalidations from the object cache.

5. The system of claim 1, wherein the object cache is a shared cache and wherein the computer-executable instructions are executable to:

obtain a lock on the shared cache using a shared lock file stored at a shared location; and clear the cached objects from the shared cache while the lock is asserted.

6. The system of claim 5, wherein the computer-executable instructions are executable to access the invalidation status from a shared invalidation status file.

7. The system of claim 6, wherein the computer-executable instructions are executable to update the invalidation status in the shared invalidation status file.

8. The system of claim 1, wherein the cached objects comprise objects of a web site used to generate page code.

9. The system of claim 1, wherein the computer-executable instructions are executable to implement a loop to periodically poll the broadcast cache invalidation queue for a new set of unprocessed invalidations, clear cached objects from the object cache based on the new set of unprocessed invalidations and update the invalidation status based on processing the new set of unprocessed invalidations.

10. The system of claim 1, wherein the notifications of operations that affect objects in the repository comprise records of operations received from a remote node.

11. The system of claim 10, wherein the broadcast cache invalidation queue comprises the records of operations.

12. A computer program product comprising a computer readable medium storing computer-executable instructions executable by a processor to:

receive notifications of operations that affect objects in a repository;

store cache invalidations in a broadcast cache invalidation queue accessible by a plurality of nodes, the cache invalidations identifying objects affected by the operations, each cache invalidation in the broadcast cache invalidation queue having a corresponding sequence identifier;

maintain an object cache of objects published to a first node of the plurality of nodes;

configure a memory to maintain an invalidation status usable by the first node of the plurality of nodes to identify, from the broadcast cache invalidation queue, a last processed invalidation that was processed with respect to invalidating objects in the object cache used by the first node, the invalidation status comprising a first corresponding sequence identifier corresponding to the last processed invalidation;

access, by the first node, the invalidation status to determine the first corresponding sequence identifier of the last processed invalidation;

determine, by the first node, a set of unprocessed invalidations in the broadcast cache invalidation queue that have corresponding sequence identifiers subsequent to the first corresponding sequence identifier determined from the invalidation status;

process, by the first node, the set of unprocessed invalidations to clear cached objects from the object cache; and based on processing the set of unprocessed invalidations to clear cached objects from the object cache, update the invalidation status with a second corresponding sequence identifier, the second corresponding sequence identifier corresponding to a last invalidation from the set of unprocessed invalidations.

13. The computer program product of claim 12, wherein the computer-executable instructions are further executable to:

run in a selected mode of operation selected from a first mode of operation and a second mode of operation, wherein in the first mode of operation the invalidation status is stored in a database and in the second mode of operation the invalidation status is stored in an invalidation status file.

14. The computer program product of claim 12, the computer-executable instructions are executable to:

obtain an invalidation threshold; and based on a determination that a number of invalidations in the set of unprocessed invalidations exceeds the invalidation threshold, clear the entire object cache.

15. The computer program product of claim 12, wherein the computer-executable instructions are executable to obtain the set of unprocessed invalidations from the broadcast cache invalidation queue, wherein the cached objects comprise objects referenced in invalidations from the set of unprocessed invalidations.

16. The computer program product of claim 12, wherein the object cache is a shared cache and wherein the computer-executable instructions are executable to:

obtain a lock on the shared cache using a shared lock file stored at a shared location; and clear the cached objects from the shared cache while the lock is asserted.

17. The computer program product of claim 16, wherein the computer-executable instructions are executable to:

access the invalidation status from a shared invalidation status file; and update the invalidation status in the shared invalidation status file.

18. The computer program product of claim 12, wherein the cached objects comprise objects of a web site used to generate page code.

19. The computer program product of claim 12, wherein the computer-executable instructions are executable to implement a loop to periodically poll the broadcast cache invalidation queue for a new set of unprocessed invalidations, clear cached objects from the object cache based on the new set of unprocessed invalidations and update the invalidation status based on processing the new set of unprocessed invalidations.

20. The computer program product of claim 12, wherein the notifications of operations that affect objects in the repository comprise records of operations received from a remote node.

21. The computer program product of claim 20, wherein the broadcast cache invalidation queue comprises the records of operations.

* * * * *